United States Patent
Lee et al.

(10) Patent No.: US 11,032,803 B2
(45) Date of Patent: Jun. 8, 2021

(54) METHOD FOR TRANSMITTING UPLINK SIGNAL IN WIRELESS COMMUNICATION SYSTEM AND DEVICE THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/348,616

(22) PCT Filed: Nov. 13, 2017

(86) PCT No.: PCT/KR2017/012767
§ 371 (c)(1),
(2) Date: May 9, 2019

(87) PCT Pub. No.: WO2018/088857
PCT Pub. Date: May 17, 2018

(65) Prior Publication Data
US 2020/0068557 A1    Feb. 27, 2020

Related U.S. Application Data

(60) Provisional application No. 62/421,276, filed on Nov. 12, 2016, provisional application No. 62/422,071, (Continued)

(51) Int. Cl.
*H04W 4/00*      (2018.01)
*H04W 72/04*    (2009.01)
(Continued)

(52) U.S. Cl.
CPC ....... *H04W 72/0413* (2013.01); *H04L 1/1812* (2013.01); *H04L 1/1887* (2013.01);
(Continued)

(58) Field of Classification Search
CPC ....... H04L 1/18; H04L 1/1812; H04L 1/1854; H04L 1/1861; H04L 1/1887;
(Continued)

(56) References Cited

U.S. PATENT DOCUMENTS 9,596,699 B2 *   3/2017   Uchino ............. H04W 72/1284
10,069,613 B2 *   9/2018   Nory ..................... H04L 5/0042
(Continued)

FOREIGN PATENT DOCUMENTS

CN      104067545      9/2014
CN      105933100      9/2016
(Continued)

OTHER PUBLICATIONS

ZTE, ZTE Microelectronics, Simultaneous transmission and reception in sTTI, 3GPP TSG RAN WG1 Meeting #86bis, R1-1609375, 4 pages, Oct. 2016.*
(Continued)

*Primary Examiner* — Frank Duong
(74) *Attorney, Agent, or Firm* — Dentons US LLP

(57) ABSTRACT

A method for transmitting an uplink signal in a wireless communication system according to an embodiment of the present disclosure is performed by a terminal and includes: a step for receiving on at least one serving cell, a downlink data channel based on short transmission time interval (sTTI); and a step for transmitting Hybrid Automatic Repeat Request (HARQ)-acknowledgment (ACK) information about the received downlink data channel, wherein a cell to which an uplink control channel on which the HARQ-ACK information is to be carried is to be transmitted can be set to support an sTTI-based operation.

14 Claims, 6 Drawing Sheets

Related U.S. Application Data filed on Nov. 15, 2016, provisional application No. 62/454,969, filed on Feb. 6, 2017, provisional application No. 62/474,595, filed on Mar. 21, 2017, provisional application No. 62/501,727, filed on May 4, 2017.

(51) Int. Cl.
   *H04L 1/18* (2006.01)
   *H04W 16/32* (2009.01)
   *H04W 72/10* (2009.01)

(52) U.S. Cl.
   CPC .......... *H04W 16/32* (2013.01); *H04W 72/10* (2013.01); *H04W 72/0446* (2013.01)

(58) Field of Classification Search
   CPC .. H04L 5/0055; H04W 16/32; H04W 52/281; H04W 52/365; H04W 52/367; H04W 72/04; H04W 72/0413; H04W 72/0446; H04W 72/10; H04W 72/12; H04W 72/1268; H04W 76/15
   See application file for complete search history.

(56) References Cited

U.S. PATENT DOCUMENTS

| | | | | |
|---|---|---|---|---|
| 10,271,316 | B2* | 4/2019 | Nogami | H04W 72/0413 |
| 10,306,657 | B2* | 5/2019 | Chen | H04W 72/0453 |
| 10,390,335 | B2* | 8/2019 | Choi | H04L 1/0025 |
| 10,594,428 | B2* | 3/2020 | Shimezawa | H04L 1/0003 |
| 10,595,312 | B2* | 3/2020 | Yeo | H04W 72/1205 |
| 10,623,155 | B2* | 4/2020 | Kim | H04L 5/0048 |
| 10,667,250 | B2* | 5/2020 | Shimezawa | H04L 1/1861 |
| 2015/0304966 | A1 | 10/2015 | Park et al. | |
| 2016/0192350 | A1* | 6/2016 | Yi | H04L 5/0035 370/329 |
| 2016/0295584 | A1 | 10/2016 | Chen et al. | |
| 2017/0223695 | A1* | 8/2017 | Kwak | H04L 27/2613 |
| 2018/0098235 | A1* | 4/2018 | Bagheri | H04L 5/0048 |
| 2018/0359745 | A1 | 12/2018 | Yeo et al. | |
| 2019/0028162 | A1* | 1/2019 | Lee | H04B 7/0486 |
| 2019/0098622 | A1* | 3/2019 | Lee | H04W 72/0446 |
| 2019/0104533 | A1* | 4/2019 | Kim | H04W 72/048 |
| 2019/0116611 | A1* | 4/2019 | Lee | H04W 72/1278 |
| 2019/0229878 | A1* | 7/2019 | Takeda | H04W 72/02 |
| 2019/0230498 | A1* | 7/2019 | Lee | H04L 5/0082 |
| 2019/0268926 | A1* | 8/2019 | Yoshimura | H04L 1/0071 |

FOREIGN PATENT DOCUMENTS

| | | | |
|---|---|---|---|
| CN | 106028454 | | 10/2016 |
| EP | 2816858 | A1 | 12/2014 |
| EP | 3280086 | A1 | 2/2018 |
| KR | 1020160013938 | | 2/2016 |
| WO | WO 2015/020440 | * | 2/2015 |
| WO | 2016159730 | A1 | 6/2016 |
| WO | 2016/148530 | A1 | 9/2016 |
| WO | 2016143967 | | 9/2016 |

OTHER PUBLICATIONS

NTT DOCOMO, Inc., sPUCCH for shortened TTI, 3GPP TSG RAN WG1 Meeting #86bis, R1-1610047, 8 pages, Oct. 2016.*
Huawei, HiSilicon, "Handling collision between sTTI and 1ms TTI", 3GPP TSG RAN WG1 Meeting #86bis, Oct. 10-14, 2016, R1-1608640.
Huawei, HiSilicon, "Discussion on CA issues for shortened TTI operation", 3GPP TSG RAN WG1 Meeting #86bis, Oct. 10-14, 2016, R1-1608653.
Catt, "On efficient multiplexing of normal TTI and sTTI", 3GPP TSG RAN WG1 Meeting #86bis, Oct. 10-14, 2016, R1-1608748.
LG Electronics, "Discussion on collisions between TTI and sTTI", 3GPP TSG RAN WG1 Meeting #87, Nov. 14-18, 2016, R1-1611772.
Catt: "Discussion on the simultaneous transmissions of (s)PUCCH and (s)PUSCH", R1-1611355, 3GPP TSG RAN G1 Meeting #87, Reno, USA , Nov. 14-18, 2016.

* cited by examiner

METHOD FOR TRANSMITTING UPLINK SIGNAL IN WIRELESS COMMUNICATION SYSTEM AND DEVICE THEREFOR

This application is a National Stage Entry of International Application No. PCT/KR2017/012767 filed Nov. 13, 2017, which claims priority to U.S. Provisional Application Nos. 62/421,276 filed Nov. 12, 2016; 62/422,071 filed Nov. 15, 2016; 62/454,969 filed Feb. 6, 2017; 62/474,595 filed Mar. 21, 2017 and 62/501,727 filed May 4, 2017, all of which are incorporated herein by reference.

TECHNICAL FIELD

The present disclosure relates to a wireless communication system, and more particularly, to a method and apparatus for transmitting an uplink signal, which support a plurality of transmission time intervals (TTIs), a plurality of processing times, or a plurality of numerologies.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure is intended to deal with uplink transmission such as transmission of a hybrid automatic repeat request (HARQ) feedback or uplink data in a wireless communication system supporting latency reduction.

DISCLOSURE

Technical Problem

The present disclosure relates to capability reporting of a user equipment (UE) having a plurality of transmission time intervals (TTIs), a plurality of processing times, or a plurality of numerologies, and a related UE operation in a carrier aggregation (CA) system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting an uplink signal in a wireless communication system, performed by a user equipment (UE), includes receiving a short transmission time interval (sTTI)-based downlink data channel in at least one serving cell, and transmitting hybrid automatic repeat request-acknowledgement (HARQ-ACK) information for the received downlink data channel. A cell to carry an uplink control channel on which the HARQ-ACK information is to be transmitted is configured to support an sTTI-based operation.

Additionally or alternatively, the at least one serving cell may be a secondary cell (Scell).

Additionally or alternatively, the cell to carry the uplink control channel may be a primary cell of an uplink control channel group to which the at least one serving cell belongs.

Additionally or alternatively, the uplink control channel may be an sTTI-based channel.

Additionally or alternatively, the method may further include reporting a simultaneous transmission capability for uplink channels having a plurality of TTI lengths to a base station.

Additionally or alternatively, the simultaneous transmission capability may be provided per band or per band combination.

Additionally or alternatively, if the UE has a simultaneous transmission capability for uplink channels having a plurality of TTI lengths, the uplink control channel and at least one uplink channel having a different TTI length from a TTI length of the uplink control channel among the uplink channels having the plurality of TTI lengths may be simultaneously transmitted in one subframe.

Additionally or alternatively, if there are a plurality of uplink control or data channels overlapped with the uplink control channel in transmission timing, two uplink channels having high priorities may be simultaneously transmitted in one subframe according to priorities of the channels.

Additionally or alternatively, the UE is a part of an autonomous driving device.

In another aspect of the present disclosure, a UE for transmitting an uplink signal in a wireless communication system includes a receiver and a transmitter, and a processor configured to control the receiver and the transmitter. The processor is configured to receive an sTTI-based downlink data channel in at least one serving cell, and to transmit HARQ-ACK information for the received downlink data channel. A cell to carry an uplink control channel on which the HARQ-ACK information is to be transmitted is configured to support an sTTI-based operation.

The aforementioned solutions are just a part of embodiments of the present disclosure. Various embodiments to which technical characteristics of the present disclosure are reflected can be drawn and understood based on detail explanation on the present disclosure to be described in the following by those skilled in the corresponding technical field.

Advantageous Effects

According to the embodiments of the present disclosure, uplink transmission may be performed efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR CARRYING OUT THE INVENTION

Figure 1:
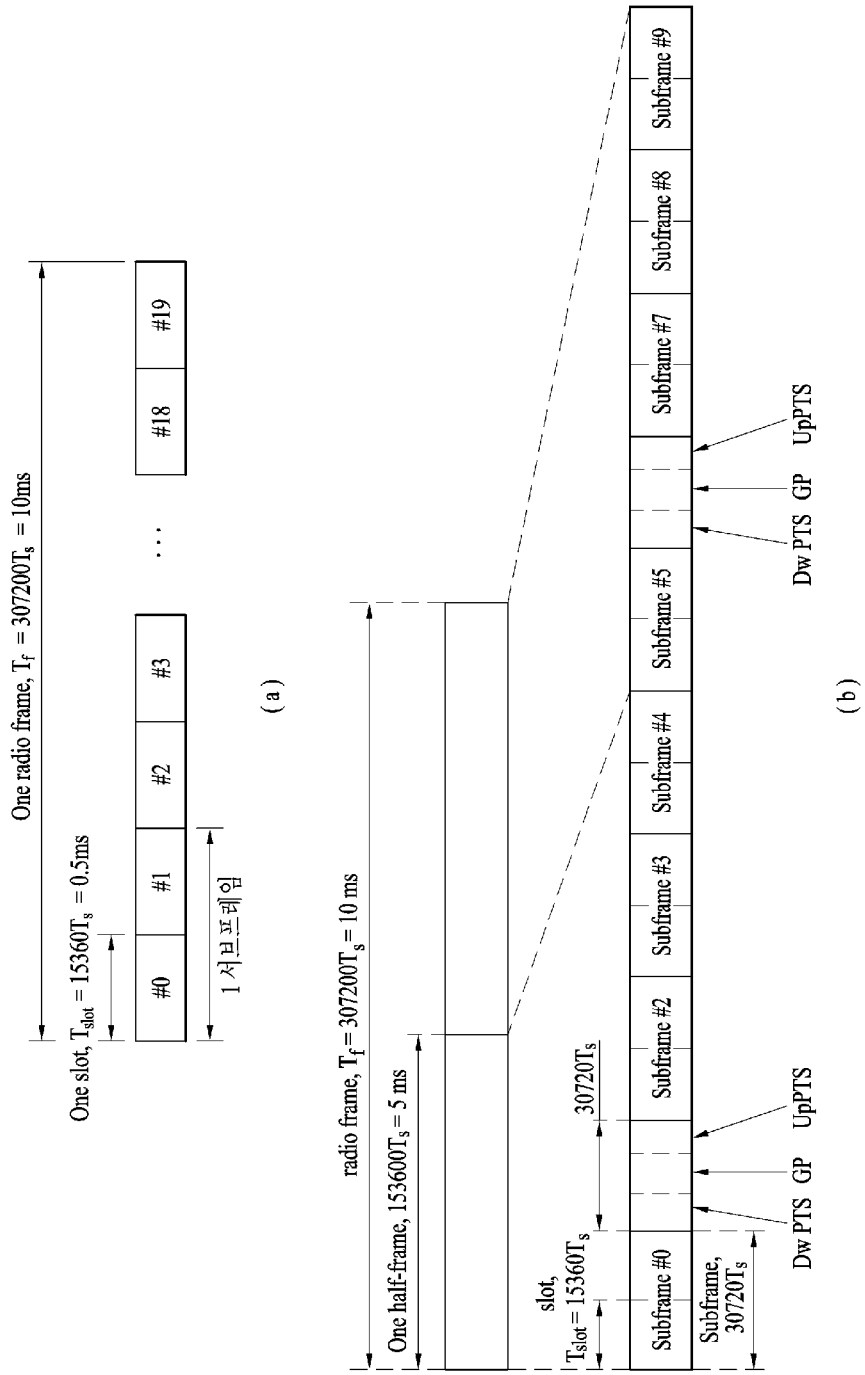
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 3 | $24144 \cdot T_s$ |  |  | $25600 \cdot T_s$ |  |  |
| 4 | $26336 \cdot T_s$ |  |  | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | $12800 \cdot T_s$ |  |  |
| 8 | $24144 \cdot T_s$ |  |  | — | — | — |
| 9 | $13168 \cdot T_s$ |  |  | — | — | — |

Figure 2:
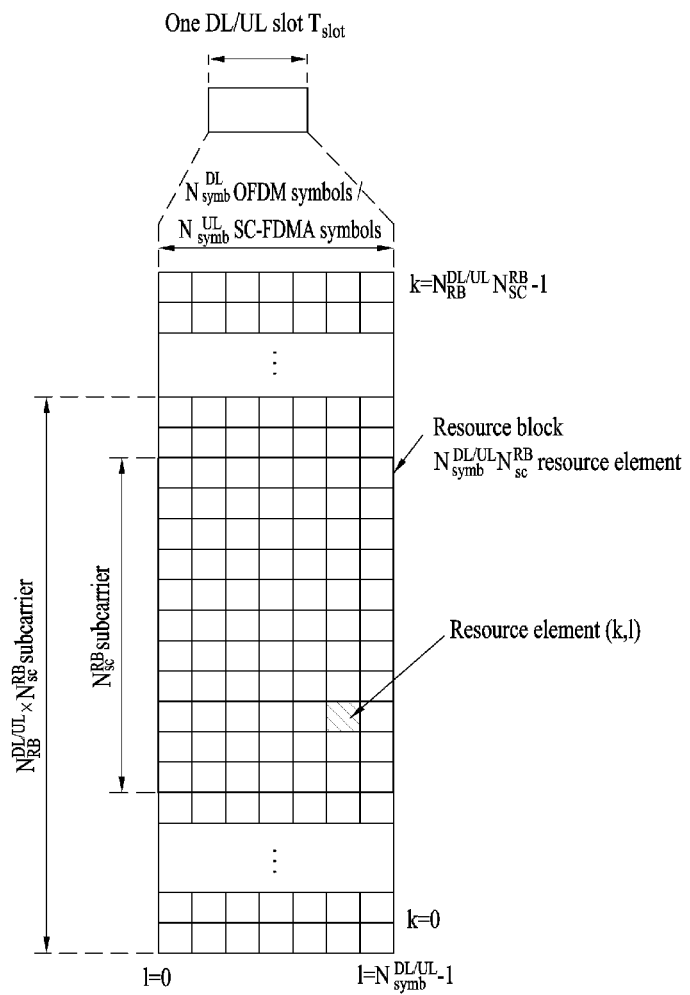
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{UL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
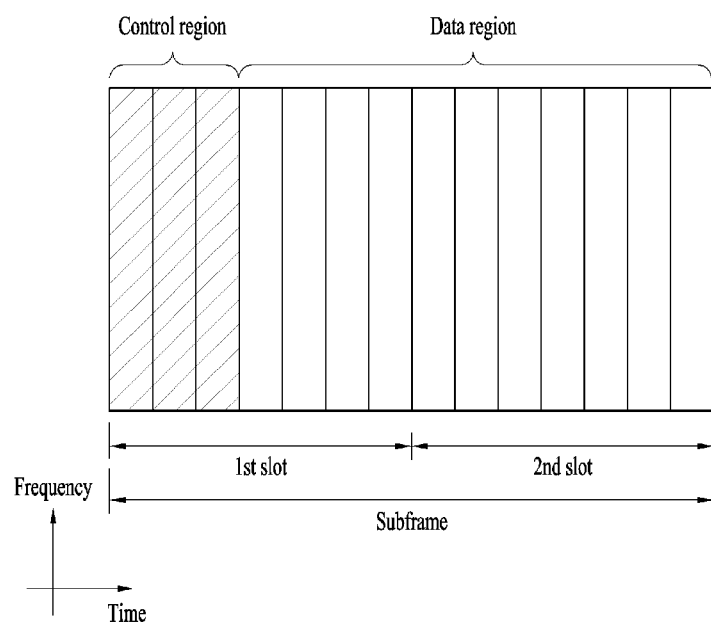
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | Number of PDCCH |
|---|---|---|---|
| Type | Aggregation Level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
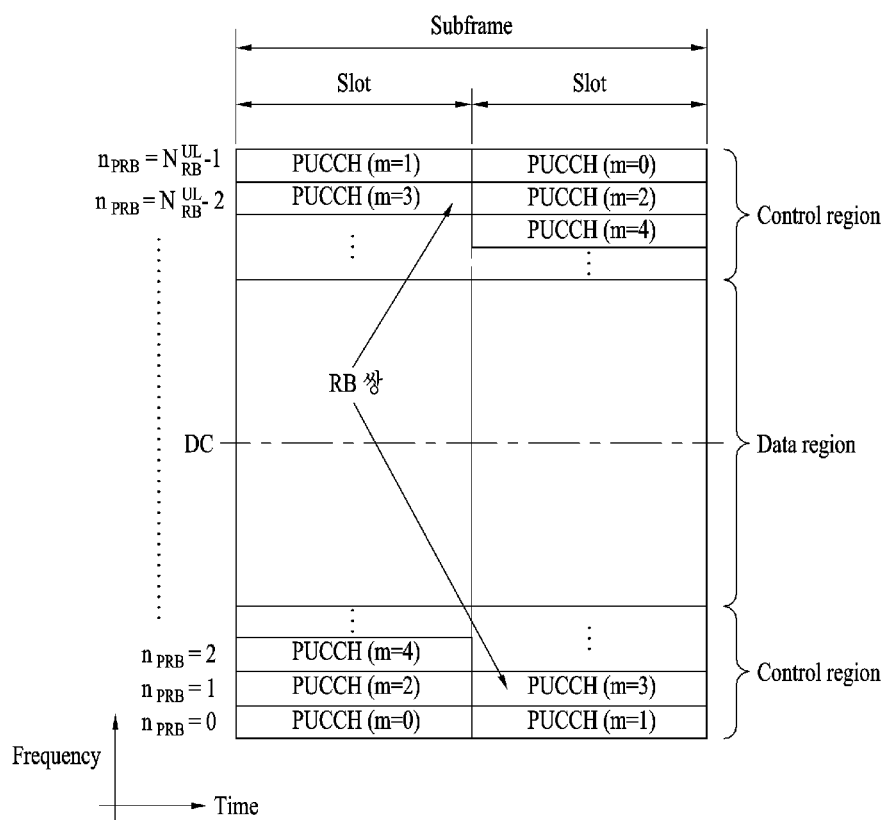
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |

TABLE 4-continued

| PUCCH format | Modulation scheme | Number of bits per subframe, $M_{bit}$ | Usage | Etc. |
|---|---|---|---|---|
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In order to satisfy requirements for various application fields, it may be considered to configure various transmission time intervals (TTIs) (or various TTI lengths) for all or a specific physical channel in the next-generation system. More characteristically, a TTI during which a physical channel such as a PDCCH/PDSCH/PUSCH/PUCCH is transmitted may be set to be less than 1 msec to reduce latency for communication between an eNB and a UE according to a scenario (such a PDCCH/PDSCH/PUSCH/PUCCH is referred to as an sPDCCH/sPDSCH/sPUSCH/sPUCCH). For a single UE or multiple UEs, a plurality of physical channels may exist in a single subframe (e.g., 1 msec), and have different TTIs (or TTI lengths). The following embodiments will be described in the context of an LTE system, for the convenience of description. A TTI may be 1 msec (normal TTI), the length of a normal subframe used in the LTE system, and a short TTI is a TTI shorter than the normal TTI, spanning one or more OFDM or SC-FDMA symbols. While a short TTI (i.e., a TTI shorter than a legacy one subframe) is taken for the convenience of description, the key features of the present disclosure may be extended to a TTI longer than one subframe or equal to or longer than 1 ms. Characteristically, the key features of the present disclosure may also be extended to a short TTI which is introduced to the next-generation system by increasing a subcarrier spacing. Although the present disclosure is described in the context of LTE, for convenience, the same thing is applicable to a technology using a different waveform/frame structure such as new radio access technology (RAT). In general, the present disclosure is based on the assumption of an sTTI (<1 msec), a longTTI (=1 msec), and a longerTTI (>1 msec). While a plurality of UL channels having different TTI lengths/numerologies/processing times have been described above, it is apparent that the following embodiments may be extended to a plurality of UL/DL channels to which different service requirements, latencies, and scheduling units are applied.

Simultaneous Transmission of UL Channels

The legacy LTE standard stipulate that a UE having the capability of simultaneously transmitting a PUCCH and a PUSCH may report the capability to a network, and the network may configure the UE to simultaneously transmit a PUCCH and a PUSCH. Since the PUCCH and the PUSCH are transmitted simultaneously, instead of UCI of the PUCCH being piggybacked to the PUSCH, more efficient UL transmission is possible.

In the case where with the introduction of a short TTI, scheduling of simultaneous transmission of a PUCCH and a PUSCH at a specific time for a UE, which has been configured with simultaneous PUCCH/PUSCH transmission, is followed by transmission of an sPUSCH or an sPUCCH, there may be a need for defining a UE operation. Further, if scheduling of simultaneous transmission of a PUCCH and PUSCH having a TTI length of x at a specific time is followed by transmission of a PUCCH or PUSCH having a shorter TTI length of y (y<x), there may be a need for defining a UE operation. More generally, if a PUCCH/PUSCH having a specific processing time (a specific numerology such as a subcarrier spacing) and a PUCCH/PUSCH having a shorter processing time (a numerology such as a subcarrier spacing) (or a longer subcarrier spacing) are to be transmitted, there may be a need for defining a UE operation. Specific examples of proposed UE operations in the above situations will be given below. More characteristically, although the channels may be transmitted by one UE, the channels may be transmitted by a plurality of UEs. In this case, it is assumed that information about channels transmitted by other UEs is known.

Further, it may be assumed that such simultaneous transmission is basically supported between channels. In the corresponding case, simultaneous transmission may or may not be configured. However, even though simultaneous transmission is configured, the simultaneous transmission may not be performed in one UE carrier in the following cases.

(1) A channel transmitted in OFDM overlaps fully or partially with a channel transmitted in discrete Fourier transform spread OFDM (DFT-s-OFDM).

(2) Channels having different numerologies overlap fully or partially with each other (it is assumed that a UE does not support more than one numerology).

(3) When a PRACH is transmitted, the PRACH overlaps fully or partially with another channel.

(4) During sidelink transmission, a PUSCH/PUCCH/SRS is transmitted in one carrier.

In the case where a UE is configured with simultaneous transmission except for the above cases that do not allow simultaneous transmission, it is assumed that unless a transmission power limitation is imposed on the UE, the UE performs simultaneous transmission. If transmission power is limited, the simultaneous transmission may be restricted. The transmission power may be limited, when more power than the maximum power of the UE is required or degradation of demodulation performance is expected due to a transient period in view of the structure of a power amplifier in the UE.

When a plurality of channels are transmitted across a plurality of carriers, an OFDM signal and a DFT-s-OFDM signal may or may not be simultaneously transmitted according to the capability of the UE.

To determine whether to perform simultaneous transmission, the following situations are considered.

A. It is assumed that whether to perform UCI piggyback may be configured. In the absence of the configuration, it may be assumed that UCI piggyback may be performed.

In the case where UCI piggyback is not performed, if one channel is to be dropped due to a power limit and carries UCI, the UCI may be dropped.

B. It may also be configured whether to perform simultaneous transmission of an SRS and another channel.

The following options may be considered in collision cases, in a situation where power is limited during simultaneous transmission under a corresponding assumption.

Case 0: Channels are protected in a descending order of UCI priorities, satisfying the condition that the power of one channel transmitted by a UE is kept constant. Regarding transmissions with the same UCI priorities, a shorter transmission has a higher priority. Or a shorter transmission may have priority over UCI priority. As far as power is maintained, a PUSCH and an sPUSCH, and a PUSCH and a PUCCH may be transmitted together. If the power is to be changed (per carrier or a transient period is needed) or power is limited, the UE may first drop or suspend transmission of a channel with a lowest priority.

As such an example, a case in which an sPUSCH starts to be transmitted in any other carrier during transmission of a PUSCH and a PUCCH in different carriers by carrier aggregation (CA) may be considered. Further, two cases may be considered: one is that a power amplifier is shared between carriers; and the other is that a power amplifier is not shared between carriers. As far as the power of a UE permits and the UE supports simultaneous transmission, the UE transmits all channels if the power of each channel can be maintained. Otherwise, at least a part of the channels is dropped according to their priorities. Then, each of the following cases may be assumed to be a priority rule, and case 0 and another case may be applied simultaneously. When PUSCH/PUCCH power is allocated through allocation of power guaranteed for each channel, and then sPUCCH/sPUSCH power can be assigned without affecting existing channels, all channels (supported by the UE) may be transmitted on the assumption that a power transient period may be endured.

Case 1: If an sPUSCH is scheduled in a TTI during which a PUCCH and a PUSCH are to be simultaneously transmitted, the UE may transmit the PUCCH and the sPUSCH together, stopping/dropping the PUSCH. The UE may have been configured with simultaneous PUCCH and PUSCH transmission. More generally, if transmission of $PUSCH_2$ having a different TTI length/numerology/processing time from that of a PUCCH and $PUSCH_1$ is scheduled at a simultaneous transmission time of the PUCCH and $PUSCH_1$ which have a specific TTI length/numerology/processing time, the PUCCH and $PUSCH_2$ may be transmitted together, while $PUSCH_1$ is stopped/dropped. Characteristically, $PUSCH_2$ may have a shorter TTI length and/or a longer subcarrier spacing and/or a shorter processing time than $PUSCH_1$. In this case, it may be said that a higher priority is assigned to $PUSCH_2$ having a higher probability of carrying urgent traffic. If $PUSCH_1$ carries UCI, the UCI may be dropped (fully or partially), may be transmitted piggybacked to $PUSCH_2$, or may be aggregated or bundled with information of the PUCCH and thus transmitted on the PUCCH. In another method, it may be determined whether to drop the UCI of $PUSCH_1$, for each UCI type and/or UCI payload size of $PUSCH_1$ and/or each TTI length of the PUCCH and/or each numerology of the PUCCH and/or each TTI length of $PUSCH_2$ and/or each numerology of $PUSCH_2$. It may be determined whether to transmit the UCI of $PUSCH_1$ on the PUCCH or $PUSCH_2$, for each UCI type and/or UCI payload size of $PUSCH_1$ and/or each TTI length of the PUCCH and/or each numerology of the PUCCH and/or each TTI length of $PUSCH_2$ and/or each numerology of $PUSCH_2$.

Case 2: If an sPUSCH is scheduled in a TTI during which a PUCCH and a PUSCH are to be simultaneously transmitted, the UE may transmit the PUCCH and the PUSCH together, dropping the sPUSCH. The UE may have been configured with simultaneous PUCCH and PUSCH transmission. That is, simultaneous transmission of a PUCCH and a PUSCH (or a plurality of UL channels) having different TTI lengths (numerologies or processing times) may not be allowed. More generally, if transmission of $PUSCH_2$ having a different TTI length/numerology/processing time from that of a PUCCH and $PUSCH_1$ is scheduled at a simultaneous transmission time of the PUCCH and $PUSCH_1$ which have a specific TTI length/numerology/processing time, the PUCCH and $PUSCH_1$ may be transmitted together, while $PUSCH_2$ is dropped. Characteristically, $PUSCH_2$ may have a shorter TTI length and/or a longer subcarrier spacing and/or a shorter processing time than $PUSCH_1$. Even though the PUSCH is dropped, if $PUSCH_2$ carries UCI, the UCI may be dropped (fully or partially), may be transmitted piggybacked to $PUSCH_1$, or may be aggregated or bundled with information of the PUCCH and thus transmitted on the PUCCH. In another method, it may be determined whether to drop the UCI of $PUSCH_2$, for each UCI type and/or UCI payload size of $PUSCH_2$ and/or each TTI length of the PUCCH and/or each numerology of the PUCCH and/or each TTI length of $PUSCH_1$ and/or each numerology of $PUSCH_1$. It may be determined whether to transmit the UCI of $PUSCH_2$ on the PUCCH or $PUSCH_1$, for each UCI type and/or UCI payload size of $PUSCH_2$ and/or each TTI length of the PUCCH and/or each numerology of the PUCCH and/or each TTI length of $PUSCH$ and/or each numerology of $PUSCH_1$.

Case 3: If the transmission timing of an sPUCCH overlaps with a TTI during which a PUCCH and a PUSCH are to be simultaneously transmitted, the UE may transmit the PUSCH and the sPUCCH, dropping the PUCCH. The UE may have been configured with simultaneous PUCCH and PUSCH transmission. More generally, if the transmission timing of $PUCCH_2$ having a different TTI length/numerology/processing time from that of a PUSCH and $PUCCH_1$ overlaps with a simultaneous transmission time of the PUSCH and $PUCCH_1$ which have a specific TTI length/numerology/processing time, the PUSCH and $PUCCH_2$ may be transmitted together, while $PUCCH_1$ is stopped/dropped. Characteristically, $PUCCH_2$ may have a shorter TTI length and/or a longer subcarrier spacing and/or a shorter processing time than $PUCCH_1$. If $PUCCH_1$ carries UCI, the UCI may be dropped (fully or partially), may be transmitted piggybacked to the PUSCH, or may be aggregated or bundled with information of $PUCCH_2$ and thus transmitted on $PUCCH_2$. In another method, it may be determined whether to drop the UCI of $PUCCH_1$, for each UCI type and/or UCI payload size of $PUCCH_1$ and/or each TTI length of $PUCCH_2$ and/or each numerology of $PUCCH_2$ and/or each TTI length of the PUSCH and/or each numerology of the PUSCH. It may be determined whether to transmit the UCI of $PUCCH_1$ on the PUSCH or $PUCCH_2$, for each UCI type and/or UCI payload size of $PUCCH_1$ and/or each TTI length of $PUCCH_2$ and/or each numerology of $PUCCH_2$ and/or each TTI length of the PUSCH and/or each numerology of the PUSCH.

Case 4: If the transmission timing of an sPUCCH overlaps with a TTI during which a PUCCH and a PUSCH are to be simultaneously transmitted, the UE may transmit the PUSCH and the PUCCH, dropping the sPUCCH. The UE may have been configured with simultaneous PUCCH and PUSCH transmission. More generally, if the transmission timing of $PUCCH_2$ having a different TTI length/numerology/processing time from that of a PUSCH and $PUCCH_1$ overlaps with a simultaneous transmission time of the PUSCH and $PUCCH_1$ which have a specific TTI length/numerology/processing time, the PUSCH and $PUCCH_1$ may be transmitted together, while $PUCCH_2$ is dropped. Characteristically, $PUCCH_2$ may have a shorter TTI length and/or a longer subcarrier spacing and/or a shorter processing time than $PUCCH_1$. If $PUCCH_2$ carries UCI, the UCI may be dropped (fully or partially), may be transmitted piggybacked to the PUSCH, or may be aggregated or bundled with information of $PUCCH_1$ and thus transmitted on $PUCCH_1$. In another method, it may be determined whether to drop the UCI of $PUCCH_2$, for each UCI type and/or UCI payload size of $PUCCH_2$ and/or each TTI length of $PUCCH_1$ and/or each numerology of PUCCH$_1$ and/or each TTI length of the PUSCH and/or each numerology of the PUSCH. It may be determined whether to transmit the UCI of PUCCH$_2$ on the PUSCH or PUCCH$_1$, for each UCI type and/or UCI payload size of PUCCH$_2$ and/or each TTI length of PUCCH$_1$ and/or each numerology of PUCCH$_1$ and/or each TTI length of the PUSCH and/or each numerology of the PUSCH.

Case 5: If simultaneous transmission of an sPUSCH and an sPUCCH is scheduled in a TTI during which a PUSCH scheduled for a specific UE is to be transmitted, and thus overlaps with the transmission timing of the PUSCH, the UE may transmit the sPUSCH and the sPUCCH together, stopping/dropping the PUSCH. The UE may have been configured with simultaneous PUCCH and PUSCH transmission or simultaneous sPUCCH and sPUSCH transmission. More generally, if the transmission timing of PUSCH$_2$ having a different TTI length/numerology/processing time from that of a PUCCH and PUSCH$_1$ overlaps with a simultaneous transmission time of the PUCCH and PUSCH$_1$ which have a specific TTI length/numerology/processing time, the PUCCH and PUSCH$_1$ may be transmitted together, while PUSCH$_2$ is stopped/dropped. Characteristically, PUSCH$_2$ may have a longer TTI length and/or a shorter subcarrier spacing and/or a longer processing time than PUSCH$_1$. If PUSCH$_2$ carries UCI, the UCI may be dropped (fully or partially), may be transmitted piggybacked to PUSCH$_1$, or may be aggregated or bundled with information of the PUCCH and thus transmitted on the PUCCH. In another method, it may be determined whether to drop the UCI of PUSCH$_2$, for each UCI type and/or UCI payload size of PUSCH$_2$ and/or each TTI length of the PUCCH and/or each numerology of the PUCCH and/or each TTI length of PUSCH$_1$ and/or each numerology of PUSCH$_1$. It may be determined whether to transmit the UCI of PUSCH$_2$ on the PUCCH or PUSCH$_1$, for each UCI type and/or UCI payload size of PUSCH$_2$ and/or each TTI length of the PUCCH and/or each numerology of the PUCCH and/or each TTI length of PUSCH$_1$ and/or each numerology of PUSCH$_1$.

Case 5b: If simultaneous transmission of an sPUSCH and an sPUCCH is scheduled in a TTI during which a PUSCH scheduled for a specific UE is to be transmitted, and thus overlaps with the transmission timing of the PUSCH, the UE may transmit the PUSCH and the sPUCCH together, stopping/dropping the sPUSCH. More generally, if the transmission timing of PUSCH$_2$ having a different TTI length/numerology/processing time from that of a PUCCH and PUSCH$_1$ overlaps with a simultaneous transmission time of the PUCCH and PUSCH$_1$ which have a specific TTI length/numerology/processing time, the PUCCH and PUSCH$_2$ may be transmitted together, while PUSCH$_1$ is stopped/dropped. Characteristically, PUSCH$_2$ may have a longer TTI length and/or a shorter subcarrier spacing and/or a longer processing time than PUSCH$_1$. If PUSCH$_1$ carries UCI, the UCI may be dropped (fully or partially), may be transmitted piggybacked to PUSCH$_2$ or may be aggregated or bundled with information of the PUCCH and thus transmitted on the PUCCH. In another method, it may be determined whether to drop the UCI of PUSCH$_1$, for each UCI type and/or UCI payload size of PUSCH$_1$ and/or each TTI length of the PUCCH and/or each numerology of the PUCCH and/or each TTI length of PUSCH$_2$ and/or each numerology of PUSCH$_2$. It may be determined whether to transmit the UCI of PUSCH$_1$ on the PUCCH or PUSCH$_2$, for each UCI type and/or UCI payload size of PUSCH$_1$ and/or each TTI length of the PUCCH and/or each numerology of the PUCCH and/or each TTI length of PUSCH$_2$ and/or each numerology of PUSCH$_2$.

Case 6: If simultaneous transmission of an sPUSCH and an sPUCCH is scheduled in a TTI during which a PUCCH scheduled for a specific UE is to be transmitted, and thus overlaps with the transmission timing of the PUCCH, the UE may transmit the sPUSCH and the sPUCCH together, stopping/dropping the PUCCH. The UE may have been configured with simultaneous PUCCH and PUSCH transmission or simultaneous sPUCCH and sPUSCH transmission. More generally, if the transmission timing of PUCCH$_2$ having a different TTI length/numerology/processing time from that of PUCCH$_1$ and a PUSCH overlaps with a simultaneous transmission time of PUCCH$_1$ and the PUSCH which have a specific TTI length/numerology/processing time, the PUCCH and PUSCH$_1$ may be transmitted together, while PUCCH$_2$ is stopped/dropped. Characteristically, PUCCH$_2$ may have a longer TTI length and/or a shorter subcarrier spacing and/or a longer processing time than PUCCH$_1$. If PUCCH$_2$ carries UCI, the UCI may be dropped (fully or partially), may be transmitted piggybacked to the PUSCH, or may be aggregated or bundled with information of PUCCH$_1$ and thus transmitted on PUCCH$_1$.

In another method, it may be determined whether to drop the UCI of PUCCH$_2$, for each UCI type and/or UCI payload size of PUCCH$_2$ and/or each TTI length of PUCCH$_1$ and/or each numerology of PUCCH$_1$ and/or each TTI length of the PUSCH and/or each numerology of the PUSCH. It may be determined whether to transmit the UCI of PUCCH$_2$ on PUCCH$_1$ or the PUSCH, for each UCI type and/or UCI payload size of PUCCH$_2$ and/or each TTI length of PUCCH$_1$ and/or each numerology of PUCCH$_1$ and/or each TTI length of the PUSCH and/or each numerology of the PUSCH.

Case 6b: If simultaneous transmission of an sPUSCH and an sPUCCH is scheduled in a TTI during which a PUCCH scheduled for a specific UE is to be transmitted, and thus overlaps with the transmission timing of the PUCCH, the UE may transmit the sPUSCH and the PUCCH, stopping/dropping the sPUCCH. The UE may have been configured with simultaneous PUCCH and PUSCH transmission or simultaneous sPUCCH and sPUSCH transmission. More generally, if the transmission timing of PUCCH$_2$ having a different TTI length/numerology/processing time from that of PUCCH$_1$ and a PUSCH overlaps with a simultaneous transmission time of PUCCH$_1$ and the PUSCH which have a specific TTI length/numerology/processing time, PUCCH$_2$ and the PUSCH may be transmitted together, while PUCCH$_1$ is stopped/dropped. Characteristically, PUCCH$_2$ may have a longer TTI length and/or a shorter subcarrier spacing and/or a longer processing time than PUCCH 1. If PUCCH$_1$ carries UCI, the UCI may be dropped (fully or partially), may be transmitted piggybacked to the PUSCH, or may be aggregated or bundled with information of PUCCH$_2$ and thus transmitted on PUCCH$_2$. In another method, it may be determined whether to drop the UCI of PUCCH$_1$, for each UCI type and/or UCI payload size of PUCCH$_1$ and/or each TTI length of PUCCH$_2$ and/or each numerology of PUCCH$_2$ and/or each TTI length of the PUSCH and/or each numerology of the PUSCH. It may be determined whether to transmit the UCI of $PUCCH_1$ on $PUCCH_2$ or the PUSCH, for each UCI type and/or UCI payload size of $PUCCH_1$ and/or each TTI length of $PUCCH_2$ and/or each numerology of $PUCCH_2$ and/or each TTI length of the PUSCH and/or each numerology of the PUSCH.

More generally, if there are UL channel(s) having a specific TTI length/numerology/processing time and UL channel(s) having a different TTI length/numerology/processing time from the specific TTI length/numerology/processing time, and simultaneous transmission of a corresponding plurality of UL channels is scheduled, it may be regulated that priority is given to a specific combination of UL channels, while the remaining UL channels are stopped/dropped.

For example, if the transmission timings of a PUSCH, a PUCCH, an sPUSCH, and an sPUCCH overlap with each other, it may be regulated that only the PUSCH and the sPUSCH should be transmitted. In another method, if there are UL channel(s) having a specific TTI length/numerology/processing time and UL channel(s) having a different TTI length/numerology/processing time from the specific TTI length/numerology/processing time, and simultaneous transmission of a corresponding plurality of UL channels is scheduled, it may be regulated that only two high-priority UL channels (or only a predetermined number of high-priority UL channels) are transmitted according to their predetermined priorities, and the remaining UL channels are dropped. The priorities of UL channels (UL channel combinations) may be determined according to the TTI lengths and/or numerologies and/or processing times and/or presence or absence of UCI of the UL channels. Characteristically, with top priority given to UCI protection, the priorities of channels may be defined in the order of the presence or absence of UCI in channel>UCI priority>TTI length/numerology/processing time. Further, with top priority given to latency, the priority levels of channels may be defined in the order of TTI length/numerology/processing time>the presence or absence of UCI in channel>UCI priority.

Further, if there are UL channel(s) having a specific TTI length/numerology/processing time and UL channel(s) having a different TTI length/numerology/processing time from the specific TTI length/numerology/processing time, and simultaneous transmission of a corresponding plurality of UL channels is scheduled, the number of channels to be finally transmitted at the same time may be determined according to the simultaneous transmission capability of the UE. Herein, the channels to be transmitted simultaneously may be determined according to the predefined priorities of the channels (e.g., the presence or absence of UCI in channel>UCI priority>TTI length/numerology/processing time, or TTI length/numerology/processing time>the presence or absence of UCI in channel>UCI priority). UCI of a dropped channel may be mapped to and transmitted on a transmitted channel.

Characteristically, it may be regulated that UCI of a dropped channel should be mapped first to a channel having a long TTI length and/or a data channel rather than a control channel, among channels selected for transmission. For example, the UCI may be mapped in such an order as PUSCH>PUCCH>sPUSCH>sPUCCH or according to priorities.

Further, with latency considered first, it may be regulated that UCI of a dropped channel should be mapped first to a channel having a short TTI length and/or a control channel rather than a data channel, among channels selected for transmission. For example, the UCI may be mapped in such an order as sPUCCH>sPUSCH>PUCCH>PUSCH or according to priorities.

Further, with latency considered first, it may be regulated that UCI of a dropped channel should be mapped first to a channel having a short TTI length and/or a data channel rather than a control channel, among channels selected for transmission. For example, the UCI may be mapped in such an order as sPUSCH>PUCCH>sPUCCH>PUCCH or sPUSCH>sPUCCH>PUSCH>PUCCH, or according to priorities.

Further, it may be regulated that UCI of a dropped channel should be mapped first to a data channel, among channels selected for transmission. For example, the UCI may be mapped in such an order as PUSCH>sPUSCH>PUCCH>sPUCCH, or sPUSCH>PUSCH>sPUCCH>PUCCH, or PUSCH>sPUSCH>PUCCH>sPUCCH, or sPUSCH>PUSCH>PUCCH>sPUCCH, or according to priorities.

It may be determined whether to map the UCI of the dropped channel to the channel determined based on the priorities and transmit the UCI on the determined channel, according to resources allocated to the determined channel and/or the payload size of the UCI and/or the type of the UCI and/or the TTI length/numerology/processing time of the dropped channel and/or the TTI length/numerology/processing time of the determined channel. If all channels to be transmitted or x highest-priority channel(s) among the channels to be transmitted cannot afford to carry the UCI, the UCI may be dropped.

Further, a channel to carry the UCI may be finally determined by allowing piggyback of the UCI, for each same TTI length/numerology/processing time, and then considering the priorities of different TTI lengths/numerologies/processing times. For example, if the transmission timings of a PUSCH, a PUCCH, an sPUSCH, and an sPUCCH overlap with each other, UCI of the PUCCH is piggybacked to the PUSCH and UCI of the sPUCCH is piggybacked to the sPUSCH, and then a final channel to carry the UCI may be determined according to whether the PUSCH and the sPUSCH can be transmitted/configured simultaneously.

Further, a channel to carry UCI may be finally determined by allowing piggyback of the UCI to each channel of the same type, and then considering the priorities of different UCI types. For example, if the transmission timings of a PUSCH, a PUCCH, an sPUSCH, and an sPUCCH overlap with each other, UCI of the PUCCH is piggybacked to the sPUCCH and UCI of the PUSCH is piggybacked to the sPUSCH, and then a final channel to carry UCI may be determined according to whether the sPUCCH and the sPUSCH can be transmitted/configured simultaneously.

Simultaneous Transmission Configuration

A simultaneous PUCCH and PUSCH transmission configuration may be configured per TTI length and/or per numerology and/or per processing time, for a UE. Further, a simultaneous transmission configuration of a PUCCH and a PUSCH having different TTI lengths and/or different numerologies and/or different processing times may be configured for the UE. Further, a simultaneous transmission configuration of two UL channels having different TTI lengths and/or different numerologies and/or different processing times may be configured for the UE. Further, a simultaneous transmission configuration of a plurality of UL channels having different (or the same) TTI lengths and/or different (or the same) numerologies and/or different (or the same) processing times may be configured for the UE. The configuration may be a maximum number of simultaneously transmittable UL channels or an individual report of whether simultaneous transmission is to be performed for a specific combination. The simultaneous transmission configuration may include PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times).

Further, if simultaneous PUCCH and PUSCH transmission is configured for a UE, it may be regulated that simultaneous transmission of all combinations (e.g., PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times)) in the simultaneous transmission configuration, or simultaneous transmission of (the channels of) a specific combination (predefined/pre-agreed or indicated by higher-layer/physical-layer signaling) is configured for the UE. If a plurality of UL channels overlap with each other at a specific time, it may be regulated that the UE is allowed to simultaneously transmit only a part of the UL channels (during a time period based on a shorter TTI among the TTIs of the plurality of UL channels).

It may be regulated that the UE reports to the network a simultaneous PUCCH and PUSCH transmission capability per TTI length and/or per numerology and/or per processing time. Further, the UE may report a simultaneous transmission capability for a PUCCH and a PUSCH having different TTI lengths and/or numerologies and/or processing times to the network. The network may increase the efficiency of scheduling for the UE based on the report. More generally, the UE may report a simultaneous transmission capability for a plurality of UL channels having different (or the same) TTI lengths and/or different (or the same) numerologies and/or different (or the same) processing times to the network. The simultaneous transmission capability may be a maximum number of simultaneously transmittable UL channels or an individual report of whether a specific combination of channels can be transmitted simultaneously.

Further, the UE may report the simultaneous PUCCH and PUSCH transmission capability to the network. In this case, the report may be interpreted as indicating that the UE is capable of simultaneously transmitting all combinations (e.g., PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times)) in the simultaneous transmission configuration, or a specific combination (predefined/pre-agreed or indicated by higher-layer/physical-layer signaling).

Simultaneous Transmission Configuration Per CG

In a CA situation, cell groups (CGs) may be defined according to a specific condition, and a simultaneous transmission configuration per CG may be configured for a UE. For example, each CG may include cells having the same UL TTI length or the same transmission mode (TM). The simultaneous transmission configuration may include PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times). Characteristically, it may be regulated that a different simultaneous transmission configuration is configured for each CG. For example, only simultaneous PUCCH and PUSCH transmission may be configured for CG 1, whereas simultaneous PUCCH and PUSCH, sPUCCH and sPUSCH, or PUSCH and sPUSCH transmission may be configured for CG 2.

Further, if simultaneous PUCCH and PUSCH transmission is configured on a CG basis, it may be regulated that simultaneous transmission of all combinations (e.g., PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times)) in the simultaneous transmission configuration, or simultaneous transmission of (the channels of) a specific combination (predefined/pre-agreed or indicated by higher-layer/physical-layer signaling) is configured for the UE. If a plurality of UL channels overlap with each other at a specific time, it may be regulated that a UE is allowed to simultaneously transmit only a part of the UL channels (during a time period based on a shorter TTI among the TTIs of the plurality of UL channels). This operation may be applied in the same manner to a general CA situation without a CG configuration.

For each CG, the UE may report a capability of simultaneous transmission of PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times). Further, the UE may report a PUCCH and PUSCH simultaneous capability to the network, on a CG basis. In this case, it may be interpreted that the UE is capable of simultaneously transmitting all combinations (e.g., PUCCH/PUSCH, sPUCCH/sPUSCH, sPUCCH/PUSCH, PUCCH/sPUSCH, PUSCH/sPUSCH, PUCCH/sPUCCH, PUCCH/PUSCH having different TTI lengths (or different numerologies/processing times), PUSCH/PUSCH having different TTI lengths (or different numerologies/processing times), or PUCCH/PUCCH having different TTI lengths (or different numerologies/processing times)) in the simultaneous transmission configuration, or a specific combination (predefined/pre-agreed or indicated by higher-layer/physical-layer signaling).

If a plurality of UL channels having different TTI lengths and/or different numerologies and/or different processing times differ in waveforms, it may be difficult to simultaneously transmit the UL channels. For example, if an SC-FDM waveform is transmitted in a long TTI and an OFDM waveform is transmitted in a short TTI, simultaneous transmission may be difficult in the TTIs. Accordingly, the simultaneous transmission may be allowed only for a plurality of UL channels having the same waveform. On the other hand, since simultaneous OFDM and SC-FDM transmission may be possible in a CA situation, different simultaneous transmission configurations may be configured for CA and non-CA.

In the case where simultaneous transmission is configured for a plurality of UL channels having different TTI lengths and/or different numerologies and/or different processing times, if the difference between the starting timings of the UL channels is equal to or larger than a predetermined value, it may be regulated that in spite of the simultaneous transmission configuration, the UE does not perform simultaneous transmission, and transmits only a high-priority UL channel, stopping/dropping a low-priority UL channel, or keeps transmitting a UL channel having an earlier starting timing, dropping the remaining UL channels.

The rule may be applied irrespective of whether the UE is configured to perform simultaneous transmission.

To achieve frequency diversity of a radio channel, hopping may be applied. If hopping is configured for a specific channel having a longer TTI length or a shorter subcarrier spacing, it may be regulated that hopping is applied at the same level to another channel having a shorter TTI length or a longer subcarrier spacing. For example, if slot-wise hopping is configured for a 1-ms TTI channel, a hopping pattern may be predefined for a 2-symbol TTI channel such that frequency-domain resource allocation hops at a slot level. In other words, it may be regulated that the frequency band resource allocation of the 2-symbol TTI channel is maintained within a slot. The rule of "resource allocation/hopping for a channel having a shorter TTI length or a longer subcarrier spacing" may be enabled by a higher-layer signaled configuration and/or a physical-layer signal, or may always be applicable irrespective of whether the network configures simultaneous transmission or even though a simultaneous transmission is not scheduled. Further, it may be regulated that hopping is applied at the same level to another channel having a shorter TTI length or a longer subcarrier spacing in a legacy PUSCH hopping configuration.

Resource allocation and/or a hopping pattern and/or a frequency resource offset between frequency resource allocation units of a channel having a shorter TTI length or a longer subcarrier spacing may be indicated by (1) a control channel for scheduling the channel and/or (2) slow DCI or some fast DCI in two-level DCI and/or (3) multi-TTI scheduling DCI and/or (4) offset or hopping pattern-related information may be configured by higher-layer signaling and/or (5) frequency resource allocation may be automatically determined by a predefined/agreed offset or hopping pattern. Characteristically, even though the resource allocation of the channel having a shorter TTI length or a longer subcarrier spacing indicates the same value during a specific time period, actual resource allocation may be changed on a slot basis (or on the basis of a predetermined time unit in which resource allocation is maintained) according to the offset or hopping pattern.

Further, if hopping is configured for a specific channel having a longer TTI length or a shorter subcarrier spacing, it may be regulated that simultaneous transmission of the specific channel and another channel having a shorter TTI length or a longer subcarrier spacing is not allowed.

Further, if simultaneous transmission of a specific channel having a longer TTI length or a shorter subcarrier spacing and another channel having a shorter TTI length or a longer subcarrier spacing is configured, it may be regulated that hopping is not allowed.

If the transmission timings of a plurality of UL channels having different TTI lengths and/or different numerologies and/or different processing times overlap with each other, it may be regulated that multi-cluster transmission of the UL channels is allowed according to the multi-cluster transmission capability of the UE and/or whether the network configures multi-cluster transmission. If the UE is not capable of multi-cluster transmission or the network does not configure multi-cluster transmission, it may be regulated that transmission of some of the UL channels is stopped/dropped according to the priorities of the UL channels. Legacy signaling may be reused or additional signaling may be defined, for the multi-cluster transmission capability and/or the multi-cluster transmission configuration of the network for the plurality of UL channels having different TTI lengths and/or different numerologies and/or different processing times. In the present proposal, the plurality of UL channels may be a plurality of UL data channels having different TTI lengths and/or different numerologies and/or different processing times, or a plurality of UL control channels having different TTI lengths and/or different numerologies and/or different processing times.

Characteristically, the above case may correspond to scheduling of UL channel transmissions at the same time point by a plurality of UL grants at different time points. For example, the plurality of UL channels may be a PUSCH and an sPUSCH, including PUSCHs with UL grant-to-UL data transmission timing of an $(n+k1)^{th}$ TTI and an $(n+k2)^{th}$ TTI, respectively.

More characteristically in the foregoing UE capability reporting, for each band and/or each CC and/or each band combination and/or each CC combination, the UE may report to the network a simultaneous transmission capability for a plurality of UL channel combinations having different TTI lengths and/or different numerologies and/or different processing times (e.g., PUCCH/PUSCH, sPUCCH/sPUSCH, sPUCCH/PUSCH, PUCCH/sPUSCH, PUSCH/sPUSCH, PUCCH/sPUSCH, PUCCH/PUSCH having different TTI lengths (or different numerologies/processing times, PUSCH/PUSCH having different TTI lengths (or different numerologies/processing times, or PUCCH/PUCCH having different TTI lengths (or different numerologies/processing times).

According to the current LTE standard, if multiple timing advance groups (TAGs) are configured, and PUCCH/PUSCH transmission in an it subframe of a serving cell belonging to a specific TAG overlaps with the first symbol of a PUSCH in an $(i+1)^{th}$ subframe of a serving cell belonging to another TAG, and power is limited, the UE may control its transmission power such that the total transmission power of the overlapped part does not exceed P_CMAX. If this rule is still to be applied to a case of overlap with an sTTI, the sTTI may be affected relatively seriously, thereby significantly degrading demodulation performance. Moreover, if the overlapped part is an RS, demodulation may be deadly affected.

Therefore, if (s)-PUCCH/(s)PUSCH transmission in a serving cell of a specific TAG overlaps in the time domain with (s)PUSCH transmission in a serving cell of another TAG, and power is limited, or if (s)PUCCH/(s)PUSCH transmission in a serving cell of a specific TAG within a specific PUCCH group (or cell group) overlaps in the time domain with (s)PUSCH transmission in a serving cell of another TAG within another PUCCH group (or cell group), and power is limited, the following UE operations may be defined.

Proposal 1: A transmission having a later starting and/or ending timing between two transmissions may be dropped. For example, if a DM-RS of an sTTI is front-loaded, the first symbol of the later one of overlapped channels in time may be significantly affected, and thus the channel may be dropped.

Proposal 2: A transmission having a longer TTI length (or a shorter subcarrier spacing) between two transmissions may be dropped. This operation may be intended to give priority to a channel having a more strict latency requirement.

Proposal 3: A transmission having a shorter TTI length (or a longer subcarrier spacing) between two transmissions may be dropped.

A UE operation for an overlap case may be defined by combining the above proposals.

More specifically, the drop operation may be configured by higher-layer (or physical-layer) signaling in the above proposals. For example, if dropping is configured, the drop operation may be performed as in the above proposals. If dropping is not configured, the UE operation may be to control power such that total power does not exceed P_CMAX, like a legacy DC operation. Further, if a maximum difference between TA values of TAGs is equal to or larger than a predetermined value (and/or a symbol/TTI over which the two transmissions are overlapped is equal to or larger than a predetermined value), the UE operation may be to apply the drop operation. Otherwise, the UE operation may be to control power such that total power does not exceed P_CMAX, as is conventional.

If a DL/UL sTTI length is configured on a PUCCH group basis, it may be regulated that the same TA is configured for all of cells configured with an sTTI operation in one PUCCH group. In other words, the UE does not expect that multiple TAGs are configured for cells configured with an sTTI operation in one PUCCH group. Further, if a DL/UL sTTI length is configured on a PUCCH group basis, cells configured with an sTTI operation in one PUCCH group may belong to one of a plurality of TAGs. Herein, it may be regulated that a maximum difference between TA values of TAGs is equal to or less than a predetermined value.

Further, it may be regulated that the same TA is configured for all cells configured with an sTTI operation, without an additional PUCCH group configuration. In other words, the UE does not expect that multiple TAGs are configured for cells configured with an sTTI operation. Further, cells configured with an sTTI operation may belong to one of a plurality of TAGs, without an additional PUCCH group configuration. Herein, it may be regulated that a maximum difference between TA values of TAGs is equal to or less than a predetermined value.

An sTTI operation may be configured on a cell basis. Therefore, if an sTTI operation is not configured for a cell configured to transmit a PUCCH (e.g., a Pcell or if a PUCCH on Scell is configured, a primary cell), the UE may not transmit an sPUCCH. For example, when the UE is to transmit an HARQ-ACK for an sPDSCH received in an Scell, on an sPUCCH (i.e., an sTTI is configured for the Scell), if a Pcell does not support the sTTI, the UE has no way to transmit the HARQ-ACK on the sPUCCH. In another example, if PUCCH groups are configured in enhanced CA (eCA), the UE is configured to transmit an HARQ-ACK for a cell within each PUCCH group on a Pcell or a primary cell (i.e., an Scell carrying or supporting a PUCCH) within the PUCCH group. However, if the Pcell or primary cell does not support the sTTI, the UE has no way to transmit the HARQ-ACK on the sPUCCH. For reference, since the HARQ-ACK for the sPDSCH received in the Pcell is configured such that the Pcell supports the sTTI, no problem will occur in relation to the above-described support of the sTTI related to the Scell.

In conclusion, sTTI transmission of an sTTI-based HARQ-ACK (for an sPDSCH) and/or a scheduling request (SR) and/or periodic CSI may not be supported. In this case, the following UE operations may be defined.

Proposal 1: The UE may transmit UCI on a legacy PUCCH in a cell configured for PUCCH transmission (e.g., a Pcell or if a PUCCH on Scell is configured, a primary cell).

Proposal 2: The UE may transmit UCI on an sPUCCH in a specific cell predefined/agreed or configured by higher-layer/physical-layer signaling through offloading of UCI in the cell. Characteristically, the specific cell may be, for example, a cell having the lowest cell index among cells configured with an sTTI operation.

Proposal 3: The UE may transmit UCI on an sPUCCH in a primary cell of another PUCCH group (or PUCCH cell group). It may be regulated that an sTTI operation is configured for a primary cell in at least one of a plurality of PUCCH groups. That is, the UE does not expect a situation in which an sTTI operation is not configured for any of the primary cells of all PUCCH groups. Further, for a UE configured with an sTTI operation, it may be regulated that a Pcell or primary cell of every PUCCH group is configured with an sTTI operation or supports the sTTI operation. Accordingly, the UE may transmit UCI on an sPUCCH in a Pcell or a primary cell.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a predefined signal (or a physical-layer or higher-layer signal) by an eNB.

Figure 5:
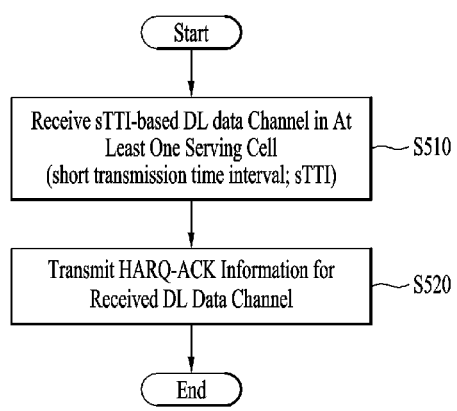
FIG. 5 illustrates an operation of a user equipment (UE) according to an embodiment of the present disclosure.

FIG. 5 illustrates an operation according to an embodiment of the present disclosure.

FIG. 5 relates to a method of transmitting a UL signal in a wireless communication system. The method may be performed by a UE.

The UE may receive an sTTI-based DL data channel in at least one serving cell (S510). The UE may transmit HARQ-ACK information for the received DL data channel (S520).

A cell to carry a UL control channel on which the HARQ-ACK information is to be transmitted may be configured to support an sTTI-based operation.

The at least one serving cell may be a secondary cell (Scell). Further, the cell to carry the UL control channel may be a primary cell of a UL control channel group to which the at least one serving cell belongs. The UL control channel may be an sTTI-based channel.

The UE may additionally report a simultaneous transmission capability for UL channels having a plurality of TTI lengths to an eNB. The simultaneous transmission capability may be provided per band or per band combination.

If the UE has the simultaneous transmission capability of the UL channels having the plurality of TTI lengths, the UE may simultaneously transmit, in one subframe, the UL control channel and at least one UL channel having a different TTI length from that of the UL control channel among the UL channels having the plurality of TTI lengths.

If there are a plurality of UL control or data channels overlapped with the UL control channel in terms of transmission timing, the UE may simultaneously transmit two high-priority UL channels in one subframe according to priorities of the channels.

Figure 6:
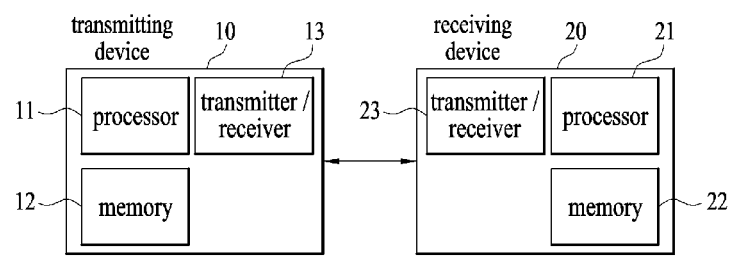
FIG. 6 is a block diagram for a device configured to implement embodiment(s) of the present disclosure.

FIG. 6 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay, and an eNB.

The invention claimed is:

1. A method of transmitting an uplink signal, by a user equipment (UE), in a wireless communication system, the method comprising:
reporting, to a base station (BS), capability information, wherein the capability information comprises information related to the simultaneous transmission capability of the uplink signal for different transmission time interval (TTI) lengths;
receiving a downlink data channel in at least one serving cell based on the capability information; and transmitting a first uplink control channel for the downlink data channel,
wherein a cell for carrying the first uplink control channel is a primary cell of an uplink control channel group to which the at least one serving cell belongs, and
wherein the primary cell for carrying the first uplink control channel is configured to support a short TTI (sTTI)-based operation based on the sTTI-based operation being configured for the at least one serving cell.

2. The method according to claim 1, wherein the at least one serving cell is a secondary cell (Scell) of the uplink control channel group.

3. The method according to claim 1, wherein the UE is a part of an autonomous driving device.

4. The method according to claim 1, wherein the first uplink control channel is an sTTI-based channel.

5. The method according to claim 1, further comprising:
receiving scheduling information related to a simultaneous transmission configuration and a simultaneous transmission time of a second uplink control channel and an uplink data channel based on the capability information,
wherein a transmission time of the first uplink control channel overlaps with the simultaneous transmission time,
wherein a TTI length of the first uplink control channel and a TTI length of the uplink data channel are different from each other, and
wherein the first uplink control channel and the uplink data channel are simultaneously transmitted.

6. The method according to claim 1, wherein based on the transmission time of the first uplink control channel overlapping with the simultaneous transmission time, dropping the second uplink control channel and transmitting the first uplink control channel and the uplink data channel simultaneously, and
wherein control information of the second uplink control channel is transmitted by being merged with the first uplink control channel.

7. The method according to claim 1, wherein the capability information is provided per band combination.

8. A user equipment (UE) for transmitting an uplink signal in a wireless communication system, the UE comprising:
a receiver and a transmitter; and
a processor configured to control the receiver and the transmitter,
wherein the processor is configured to:
report, to a base station (BS), capability information, wherein the capability information comprises information related to the simultaneous transmission capability of the uplink signal for different transmission time interval (TTI) lengths,
receive a downlink data channel in at least one serving cell based on the capability information, and
transmit a first uplink control channel for the downlink data channel, and
wherein a cell for carrying the first uplink control channel is a primary cell of an uplink control channel group to which the at least one serving cell belongs, and
wherein the primary cell for carrying the first uplink control channel is configured to support a short TTI (sTTI)-based operation based on the sTTI-based operation being configured for the at least one serving cell.

9. The UE according to claim 8, wherein the UE is a part of an autonomous driving device.

10. The UE according to claim 8, wherein the at least one serving cell is a secondary cell (Scell) of the uplink control channel group.

11. The UE according to claim 8, wherein the capability information is provided per band combination.

12. The UE according to claim 8, wherein the first uplink control channel is an sTTI-based channel.

13. The UE according to claim 1, wherein the processor is further configured to receive scheduling information related to a simultaneous transmission configuration and a simultaneous transmission time of a second uplink control channel and an uplink data channel based on the capability information, and
wherein a transmission time of the first uplink control channel overlaps with the simultaneous transmission time,
wherein a TTI length of the first uplink control channel and Drill a TTI length of the uplink data channel are different from each other, and
wherein the first uplink control channel and the uplink data channel are simultaneously transmitted.

14. The UE according to claim 13, wherein based on the transmission time of the first uplink control channel overlapping with the simultaneous transmission time, the processor is configured to drop the second uplink control channel and simultaneously transmit the first uplink control channel and the uplink data channel, and
wherein control information of the second uplink control channel is transmitted by being merged with the first uplink control channel.

* * * * *